May 8, 1934. M. FIELDMAN 1,957,996
HYDRAULIC SHOCK ABSORBER
Original Filed April 2, 1928 4 Sheets-Sheet 1
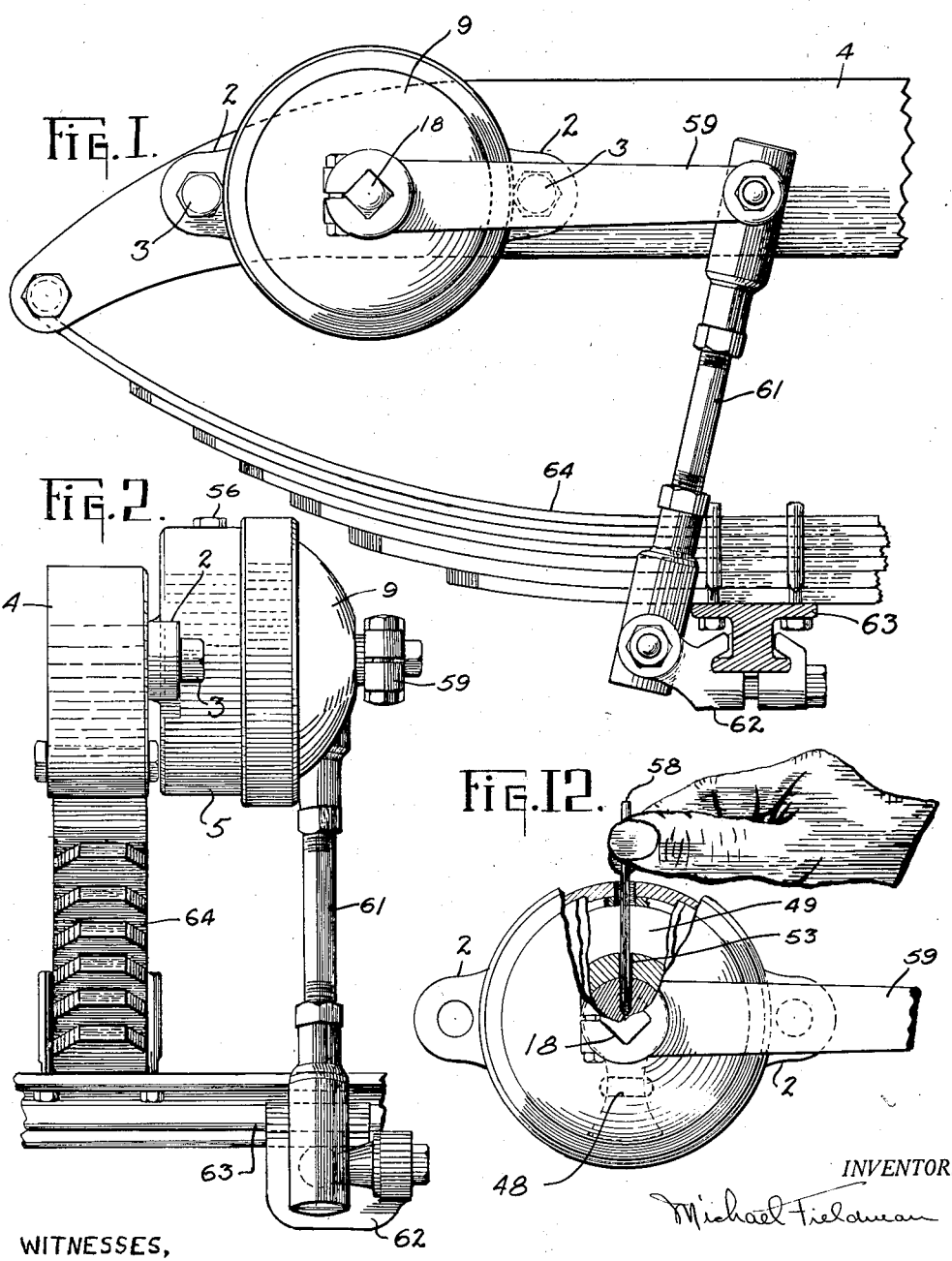

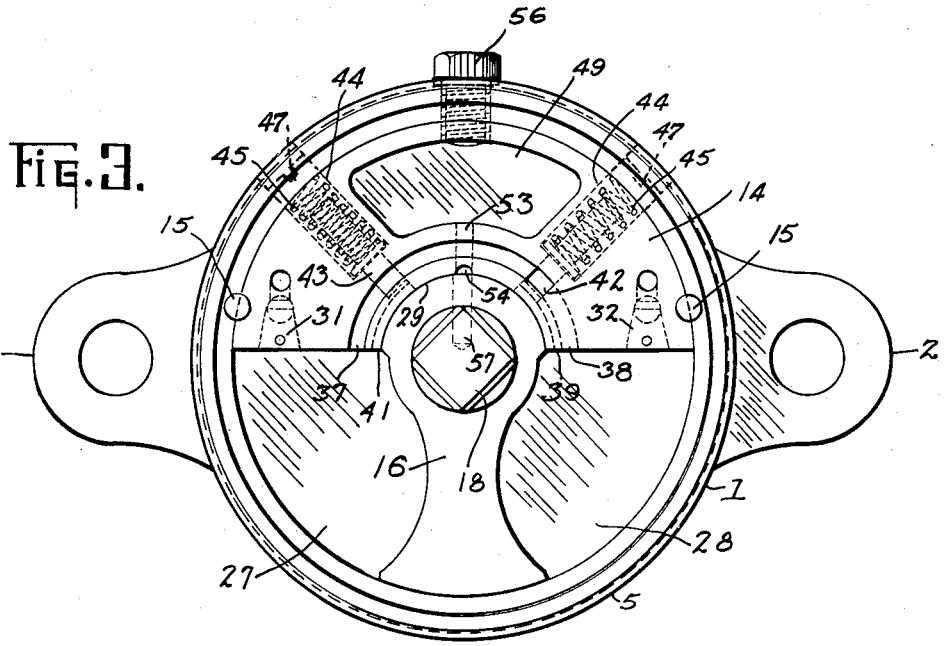
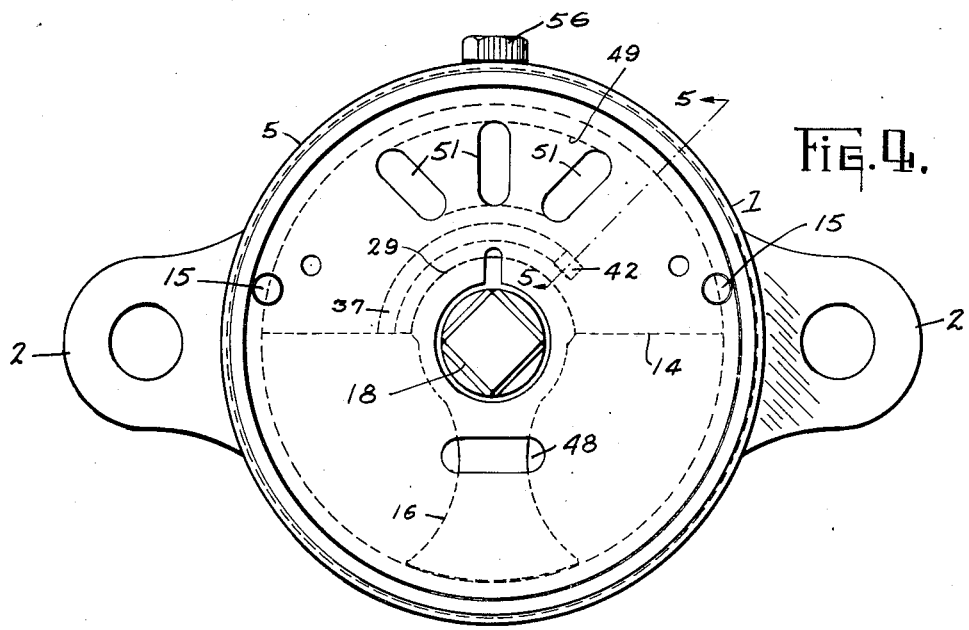

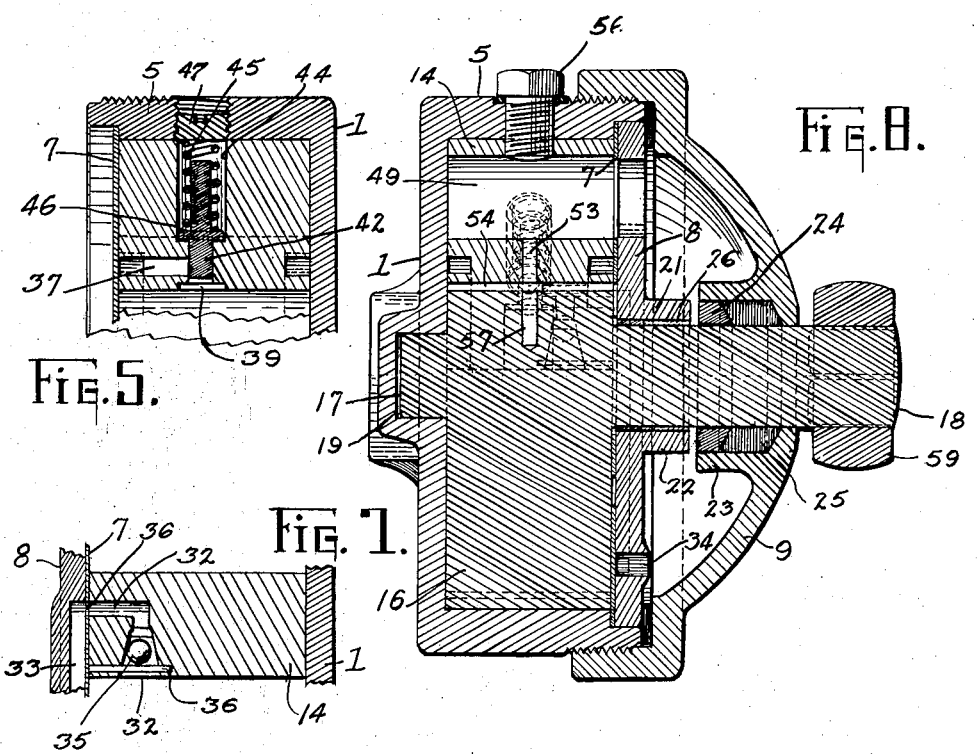
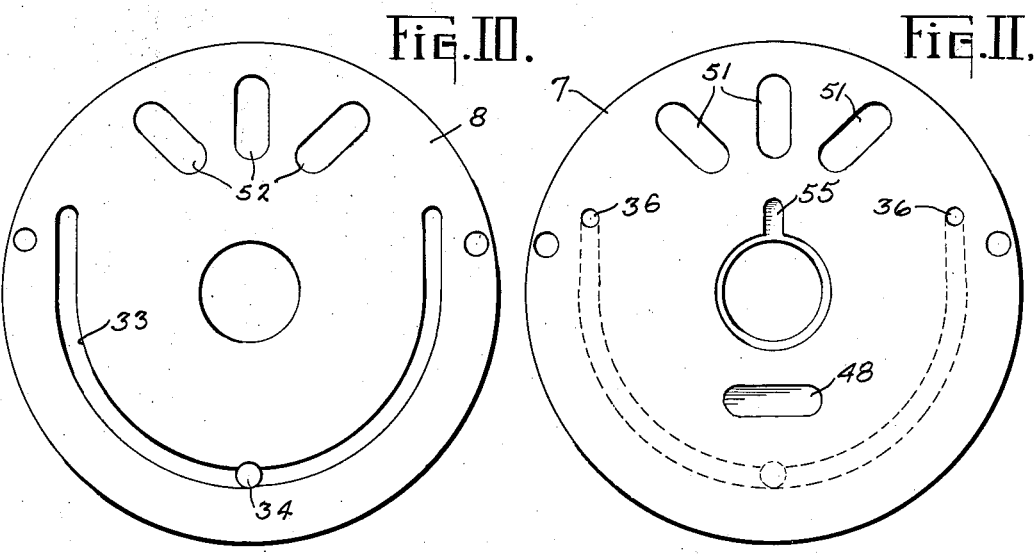

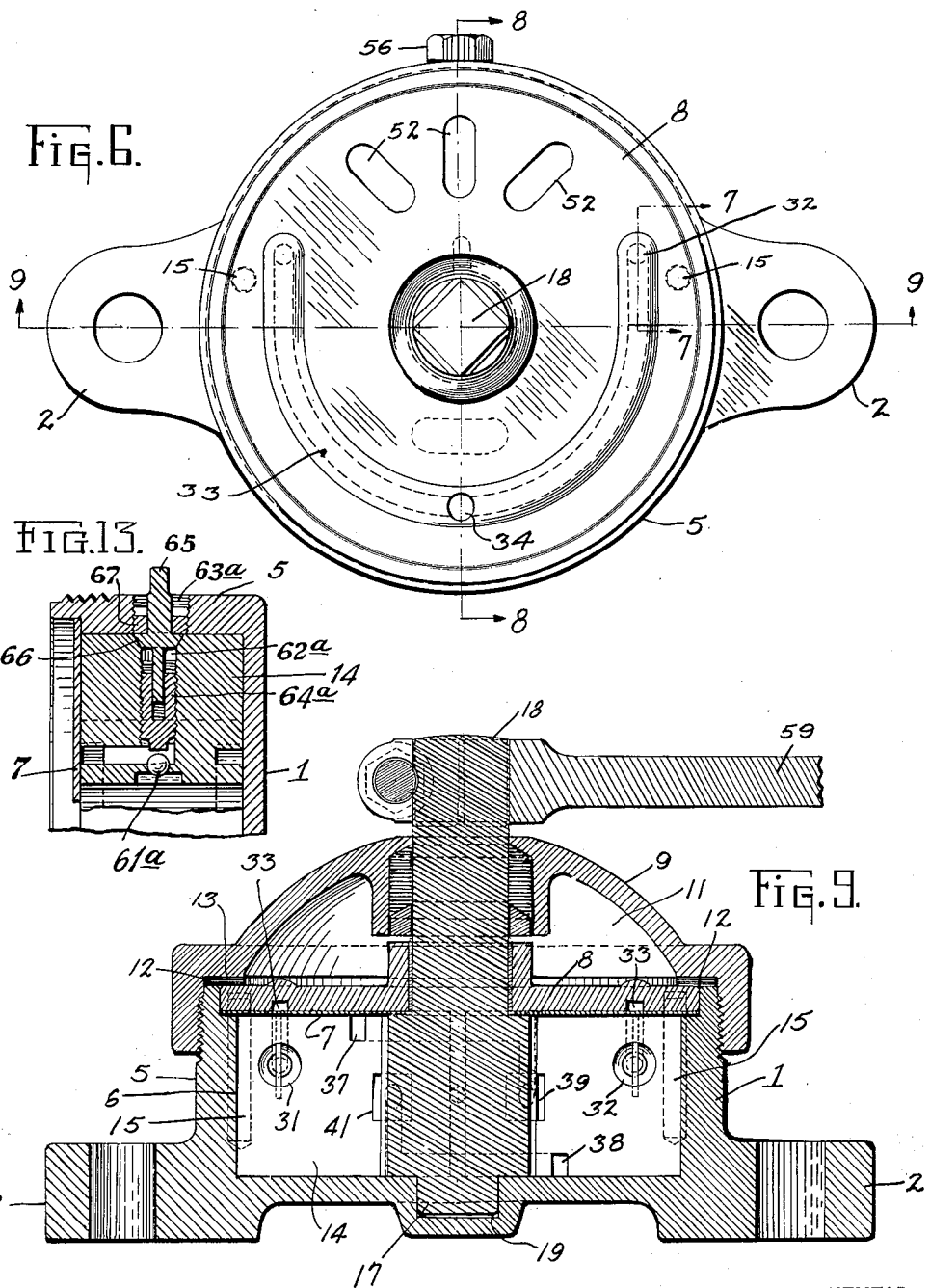

Patented May 8, 1934

1,957,996

UNITED STATES PATENT OFFICE 1,957,996

HYDRAULIC SHOCK ABSORBER

Michael Fieldman, Philadelphia, Pa., assignor of one-half to N. A. Petry Company, Inc., Philadelphia, Pa., a corporation of Pennsylvania Application April 2, 1928, Serial No. 266,676
Renewed September 22, 1933

19 Claims. (Cl. 188—89)

This invention relates to improvements in shock absorbers of the hydraulic type, and the principal object of the invention is to provide a shock absorber which shall be efficient in operation, durable, substantially free from leakage, which shall automatically compensate for the effects of changing temperature upon the liquid actuating medium, and which shall be relatively simple in form, cheap, and relatively easy to manufacture.

A more specific object of my invention is to provide a hydraulic shock absorber having provision for storage of a considerable quantity of fluid in excess of that required within the operating chamber, together with means whereby the excess fluid is automatically supplied as required to replenish the fluid in the working chamber.

Another object of the invention is to provide a shock absorber of the stated type which shall afford individually determinable resistances to control the compression movement of the spring and the rebound movement, said resistances if desired being adjustable from the exterior of the shock absorber casing, or being so mounted as to be inaccessible except by disassembling the device so that the resistances are not subject to tampering.

A still further object of the invention is to provide a shock absorber wherein the pressure controlling means shall be automatically adjustable to compensate for seasonal changes in temperature, so that an increase or decrease in the viscosity of the actuating fluid will be automatically compensated.

Another object of the invention is to provide a shock absorber having means for effectively relieving the pressure of the fluid around that portion of the shaft which projects through the casing and for recovering such fluid as may be forced from the pressure chamber outwardly around the shaft.

A still further object of the invention is to provide a device of the stated character having simple means for accurately setting the piston at a desirable neutral position during installation.

The invention further resides in certain novel structural features and details hereinafter set forth and illustrated in the attached drawings, in which:

Figure 1 is a front elevation of a shock absorber made in accordance with my invention together with parts of a vehicle with which the shock absorber is immediately associated;

Fig. 2 is a front elevation of the parts shown in Fig. 1;

Fig. 3 is a front elevation of the device with certain parts removed to disclose the working chamber;

Fig. 4 is a view similar to that of Fig. 3 with one of the working chamber cover plates in position;

Fig. 5 is a fragmentary sectional view on the line 5—5, Fig. 4;

Fig. 6 is a front elevation of the device similar to Fig. 4 but with the outer cover plate in position over the working chamber;

Fig. 7 is a fragmentary sectional view on the line 7—7, Fig. 6;

Fig. 8 is a section on the line 8—8, Fig. 6;

Fig. 9 is a section on the line 9—9, Fig. 6;

Fig. 10 is a view of the inner face of the working chamber outer cover plate;

Fig. 11 is a view of the inner face of the inner cover plate with outer cover plate in proper position with respect thereto showing the relative positions of the various ports and passages;

Fig. 12 is a front elevational view of the shock absorber with a portion of the walls thereof cut away to illustrate one of the details, and Fig. 13 is a view similar to that of Fig. 5 illustrating a modification of the valve mechanism.

With reference to the drawings, my device in a preferred form comprises a main casing chamber 1 having at two sides apertured projecting lugs 2 through the medium of which and by means of bolts 3 the casing member may be secured to the frame 4 of a vehicle, as shown in Figs. 1 and 2. The member 1 comprises also a transversely projecting annular flange 5 forming an interior cylindrical chamber 6, and the outer edge of the flange 5 is recessed or countersunk to form a seat for an inner thin plate 7 and an overlying outer plate 8, all as clearly shown in Figs. 8 and 9. Threaded on the outer end of the flange 5 is a cap 9, this cap being outwardly dished to form a chamber 11 between the plate 8 and the cap. The relative dimensions of the plates 7 and 8 and of the recess in the flange 5 in which they are normally seated are such that a flat and smooth seat is provided at the joint for a gasket 12 which is confined between the end of the flange 5 and the outer face of the plate 8 and a shoulder 13 on the cap 9. It will be apparent that the cap functions to retain the plates 7 and 8 in position, and that the gasket 12 effectively seals the joint between the flange 5 and the said plates.

Mounted within the chamber 6 is a semicircular valve casing 14, this casing corresponding in width to the corresponding dimension of the chamber 6 between the inner plate 7 and the opposite side wall, as shown in Fig. 8, and also closely fitting the inner curved wall of the chamber which it occupies, see Fig. 3. The valve body is held in position by means of dowels 15 inserted in registering recesses in the valve casing and in the inner face of the flange 5. It will be noted by reference to Fig. 9 that these dowels project through the inner plate 7 and into recesses in the inner face of the plate 8, whereby they function also to retain these plates properly positioned in the casing.

The valve body 14 occupies substantially one-half of the chamber 6, the unobstructed half of this space constituting a working chamber in which operates a wing plunger 16. As shown in Figs. 3 and 8, this plunger comprises oppositely projecting journal portions 17 and 18, the journal 17 being supported in a bearing recess 19 in the inner wall of the casing 1, and the other and more extended journal or shaft 18 being supported in a bearing 21 formed by an outwardly projecting flange 22 on the plate 8. The shaft 18 also projects through the cap 9, the cap being provided with an inwardly projecting annular flange 23 which with a sleeve 24 on the journal 18 forms a stuffing box in which a suitable packing material 25 is compressed around the shaft, thereby effectively sealing the joint between the shaft and the cap. The sleeve 24 may be shrunk onto the shaft 18 after insertion thereof of the plates 7 and 8. A bushing 26 is provided in the present instance between the bearing flange 22 and the shaft 18.

It will be noted by reference to Fig. 3 that the outer edge of the piston 16 closely fits the semicircular wall of the working chamber and divides this chamber into two compartments 27 and 28 respectively. The inner peripheral portion 29 of the piston 16 also neatly fits a cylindrical recess in the face of the valve casing 14 so that a substantially tight joint is formed between this part of the piston and the valve casing, preventing passage of fluid between the chambers 27 and 28 except as provided.

The valve casing 14 is provided with two passages 31 and 32 which extend inwardly from those faces of the valve casing which respectively form walls of the chambers 27 and 28, these passages extending inwardly of the valve casing from the chambers 27 and 28 respectively and transversely to that face of the valve casing which in assembly abuts the plate 7. At these points, the passages communicate with the opposite ends of a channel 33 formed in the inner face of the plate 8, see Fig. 10. This channel has at the bottom and midsection a port 34 which communicates with the chamber 11 within the cap 9.

As well illustrated in Fig. 7, the channels 31 and 32, which are identical, are provided with a ball 35 which normally rests upon a pin 36 extending transversely of the passage 32, and which constitutes a check valve to permit flow of liquid through the passages 31 and 32 into the chambers 27 and 28, while preventing a reverse flow. It will be noted that the plate 7 is provided with apertures 36 which in assembly register with the passages 31 and 32 respectively and with the opposite ends of the channel 33. It will be apparent that the port 34, channel 33 and passages 31 and 32 constitute a connection between the chamber 11 in the cap and the chambers 27 and 28 permitting a flow of the actuating fluid from the chamber 11 to the chambers 27 and 28, but preventing a reverse flow.

It will be noted that the valve casing 14 is provided in its opposite side faces with arcuate channels 37 and 38 which at one end communicate respectively with the chambers 27 and 28 and at the other ends respectively with passages 39 and 41 formed between the abutting faces of the casing 14 and the plunger 16 by means in the present instance of grooves in the said casing, the passages 39 and 41 extending respectively to the chambers 28 and 27. The passage 39 and channel 37 with which it communicates forms a bypass between the chambers 27 and 28, and a corresponding, though independent bypass, is formed by the passages 41 and channel 38. These bypasses are controlled respectively by check valves 42 and 43 which occupy recesses 44, 44 in the casing 14 and which project through the channels 37 and 38 respectively to close the ports through which these channels communicate with the passages 39 and 41. The sectional view of Fig. 5 shows the details of the valve 42, the valve 43 being identical in form.

It will be noted by reference to Fig. 5 that the valves are normally held in the port-closing position by means of a spring 45 which is confined between a shoulder 46 on the valve stem and the inner wall of the flange 5. It will be apparent that the force required to open the valves 42 and 43 will depend upon the strength of the spring used, and that this pressure is accordingly adjustable as desired.

It is ordinarily preferable that access to the springs 45 be had only by disassembling the shock absorber as a whole so that the valve pressure springs cannot be tampered with. However, under some circumstances it is desirable that means be provided for more readily obtaining access to such springs and I have, accordingly, illustrated the valve casing as provided with removable plugs 47 directly overlying the upper ends of recesses 44. These plugs afford immediate access to the spring chambers for replacement.

A limited bypass between the chambers 27 and 28 is also provided by means of an elongated port 48 in the plate 7, this port, as shown in Fig. 4, being somewhat greater in length than the thickness of the wing piston 16 at the point immediately adjacent the port. It will be apparent that during an initial movement of the piston in either direction from a neutral position, as shown in Fig. 4, the bypass 48 provides for free movement of the actuating fluid from one of the compartments 27 or 28 to the other.

The valve casing 14 is provided in its upper midsection with a transverse chamber 49, said chamber being closed at one side by the wall of the casing 1, see Fig. 8, and communicating at the opposite side through ports 51 in the plate 7 and registering ports 52 in the plate 8 with the upper part of the chamber 11.

The chamber 49 also communicates through a vertical passage 53 with a transverse channel 54, this channel being formed by a groove in that surface of the valve casing 14 against which the upper end of the plunger 16 abuts, as shown in Figs. 3 and 8. The opening in the plate 7 through which the shaft 18 extends is made somewhat larger than the shaft, and the plate 7 is also provided with a slot 55 extending radially from this central opening, the upper end of which slot registers with one end of the channel 54. A passage is thus formed by which any of the actuating fluid accumulating around the base of the shaft 18 may escape to the chamber 49, said fluid passing from this chamber into the chamber 11 through the ports 51—52.

It will be noted that the passage 53 is in alignment with an opening through the upper end of the valve casing 14 and through the flange 5 of the casing 1 which is normally closed by a tap screw 56, see Fig. 8, and further that a recess 57 is provided in the upper end of the piston 16 which, when the piston is in the neutral position, as shown for example in Fig. 3, registers with the passage 53. By removing the screw 56, therefore, and as shown in Fig. 12, a pin 58 may be inserted through the passage 53 into the passage 57 which insures that the piston shall be in the neutral position for a purpose hereinafter set forth.

Following assembly of the shock absorber as described above, oil or other liquid-actuating medium is introduced through the opening provided for the screw 56, the fluid passing from the chamber 49 through the ports 51 and 52 into the chamber 11, and from this chamber being drawn into the compartments 27 and 28 of the working chamber by suction effected by reacting the piston in the chamber, the oil being drawn in obvious manner through the port 34, the channels 33 and the passages 31 and 32 into the respective chambers 27 and 28. When sufficient of the actuating fluid has been admitted to fill the compartments 27 and 28, the various channels and a portion of the chamber 11, the device may be applied to a vehicle, as shown in Fig. 1, the casing 1 being secured as previously set forth to the frame 4 of the vehicle by bolts 3 passed through the lugs 2.

To the outer end of the shaft 18 is secured a crank arm 59, the outer end of this arm being connected through the medium of a link 61 with a clamp 62 secured to the axle 63. In order to obtain the proper neutral setting, the pin 58 is introduced, as shown in Fig. 12 and as previously described, which retains the piston in the neutral position with respect to the bypass port 48, and the link 61 is then adjusted as to length in accordance with the space between the axle and the frame. Following this adjustment, the pin 58 is removed, and the screw 56 replaced, whereupon the shock absorber is in condition for operation to control in predetermined manner the action of the vehicle spring 64.

In operation, the device offers a practically negligible resistance to the normal movement of the axle with respect to the frame within limits determined by the length of the bypass 48, since movement of the piston in either direction within the length of the bypass results in a simple flow of the liquid from one of the compartments 27 or 28 to the other. If the relative movement of the axle and the frame is of such scope as to cause the piston moving in either direction to pass the end of the bypass 48, the liquid in that compartment into which the piston is moving must be displaced through one or other of the bypass channels 37—39 or 38—41, as the case may be, into the other compartment, such displacement being opposed by the valve 42 or 43 and the valve spring 45. Depending therefore upon the strength of the spring, the movement of the piston will be opposed by a predetermined pressure which will control the action of the vehicle spring 64 as desired.

When the movement of the piston is reversed, it will obviously operate against a body of the liquid, completely filling the chamber towards which the movement now occurs, and in this return movement, the piston again must displace the liquid, this time through the other of the channels 37—39 or 38—41, and past the valve controlling that channel.

It will be apparent that the device is adapted and intended to control not only the expansion or reaction movement of the spring 64 following an initial compression, but also the compression movement of the spring. In the present instance, it is obvious that when the axle approaches the frame, the spring 64 being compressed, the piston 16 moves counter-clockwise, see Fig. 3, with the result that the liquid medium in the compartment 28, after the piston passes the end of the fixed bypass 48, is displaced through the passage 39 and the channel 37 into the compartment 27. This relative movement of axle and frame accordingly is controlled through the valve 42 by the spring 45 associated with this valve, and this spring is selected as to strength to give the desired opposition to the movement.

On the return movement of the parts towards the normal position, the movement is retarded to an extent depending upon the strength of the spring associated with the valve 43, and the spring 45 associated with this valve is accordingly selected to give the desired retardation. Normally, this spring will be heavier and of greater strength than the spring associated with the valve 42.

It will be apparent that the opening of the valves 42 and 43 is dependent entirely upon the pressure applied at their inner ends, and that the greater this pressure the greater the valve will open. The device accordingly is self-adjustable, within the limits imposed by the sizes of the ports controlled by the valves 42 and 43, for temperature changes affecting the viscosity of the actuating fluid in the working chamber, since if the viscosity of this fluid is relatively great by reason of low temperatures, the pressure within the chambers will be relatively great and will be relieved by a correspondingly large opening of the valves 42 and 43.

Although in general it is desirable to so construct the device as to prevent tampering with the valves 42 and 43, it may be desirable for certain installations to provide valves adjustable from the exterior of the casing. In Fig. 13, I have illustrated a modification providing for this adjustment. In this instance, the spring-pressed valves 42 and 43 are replaced by ball valves 61a, and immediately over the valve seats, passages 62a are provided which at their outer ends register with tapped holes 63a in the flange 5 of the casing. The passage 62a is threaded, at least in part, for reception of a threaded valve follower 64a having a splined connection with a stem 65 which projects upwardly through the tapped hole 63a in the casing. The upper end of the passage 62a is provided with a seat for a tapered collar 66 on the stem 65, and this collar is held to its seat by means of an apertured plug 67 in the tapered hole 63a. In this manner, the upper end of the passage 62a is effectively sealed. The outer end of the stem 65 is adapted for reception of a suitable wrench so that the stem may be rotated, such rotation resulting in a longitudinal adjustment of the follower 64a whereby the extent of movement of the ball valve 61a from its seat may be regulated as desired. Obviously, the resistance to movement of the piston 16 in the working chamber may be regulated by regulating the maximum opening permitted the valves 61a.

The device described above has been found extremely efficient in operation, durable and desirable by reason of the relatively slight leakage occurring in normal operation. It will be noted that the provision of the chamber 11 affords a relatively large reservoir for oil, and that any oil leaking from the working chamber is automatically replaced by an equivalent amount drawn through the passage 33 and passages 31 and 32 from the reservoir chamber. It will further be noted that the arrangement is such that the pressure chamber is bounded on one side by the integral wall of the casing and on the other side by the reservoir chamber, and that the only casing joints are in the latter chamber, which is subjected only to normal atmospheric pressures. Such of the oil as leaks from the working chamber, therefore, is collected in the reservoir chamber, from which there is relatively small tendency for leakage to the exterior of the casing. It will also be noted that the collar 24 on the shaft 18 which is only slightly spaced from the outer end of the flange 22 of the outer plate 8 acts as a baffle to divert any oil leaking through the bearing 21 into the reservoir chamber, and that leakage past the bearing 21 is reduced to a minimum by provision of the bypass through the slot 55 in the plate 7, the channel 54, and the passage 53 to the reservoir chamber. By forming the various passages and channels in the form of surface grooves in the valve casing and in the plates 7 and 8, the cost of production is very materially reduced and the construction simplified.

It will be understood that there may be modification of the device without departure from the invention.

I claim:

1. In a hydraulic shock absorber, the combination with a main housing having a chamber, of a valve casing mounted in the chamber and leaving a portion of the chamber unobstructed, a piston operating in said unobstructed portion and dividing the latter into compartments, and independent valve-controlled bypasses in said casing extending between said compartments the effective areas of which vary with the pressures produced in their respective compartments.

2. In a hydraulic shock absorber, a housing, a valve casing in the upper part of said housing, a working chamber in the lower part of the housing, a rotary piston dividing said working chamber into compartments and having a bearing in said valve casing, bypasses between the said compartments each including a groove formed in the face of said bearing and a valve in each groove controlling the effective area of the by-pass.

3. In a hydraulic shock absorber, a housing, a valve casing in the upper part of said housing, a working chamber in the lower part of the housing, a rotary piston dividing said working chamber into compartments, and valve controlled bypasses connecting said compartments, each including grooves formed in two faces of said casing, and a passage connecting said grooves.

4. In a hydraulic shock absorber, a housing, a cover for said housing, a partition held in place by said cover and dividing the interior of the housing into two chambers, a valve casing in the upper part of one of said chambers, a piston operating in the latter chamber below the valve casing and dividing said chamber into compartments, bypasses in said valve casing connecting said compartments, valves in said casing controlling said bypasses, channels in said partitioning plate communicating with the other housing chamber, and valved passages in the valve casing connecting said channels with the respective compartments formed by said piston.

5. In a hydraulic shock absorber, a housing, a valve casing in the upper part of said housing, a working chamber in the housing below said valve casing, a rotary piston dividing said working chamber into compartments, valve-controlled bypasses in said valve casing connecting said compartments, a reservoir chamber within the housing at one side of said working chamber and separated from the working chamber by a partition, channels in said partition communicating with the bottom of said reservoir chamber, and valve-controlled passages in the valve casing communicating respectively with the compartments at opposite sides of the piston and communicating with said partition channels.

6. In a hydraulic shock absorber, a housing, a valve casing in the upper part of said housing, a working chamber in the lower part of the housing, a rotary piston dividing said working chamber into compartments, valve-controlled bypasses in said valve casing connecting said compartments, a partitioning member in said housing forming a reservoir chamber at one side of the working chamber, said partitioning member having in one face thereof a groove communicating with the bottom of the reservoir chamber, an apertured plate abutting the side of said partitioning member and forming said groove into a channel, and valve-controlled passages in said valve casing communicating with said channel through the apertures in said plate and extending respectively to the working chamber compartments at opposite sides of said piston.

7. In a hydraulic shock absorber, a housing enclosing a working chamber, a valve casing mounted in said housing above said chamber, a rotary piston operating in said working chamber and dividing said chamber into separate compartments, valve-controlled bypasses in said valve casing connecting said compartments, and a thin plate abutting the inner face of one of the side walls of said working chamber and having a port of greater width than the adjacent portion of the piston constituting a bypass between the working chamber compartments when the piston is in a neutral position.

8. In a hydraulic shock absorber, a housing enclosing a working chamber, a rotary piston mounted in said chamber and dividing the chamber into separate compartments, a valve casing mounted in said housing above the piston, pairs of grooves in said valve casing, each pair of grooves constituting a by-pass between one of said compartments and the other thereof, and spring-pressed check valves controlling communication between said grooves of each pair and the effective area of the by-pass.

9. In a hydraulic shock absorber, a housing, a partitioning member in said housing dividing the interior thereof into a working chamber and a reservoir chamber, a rotary piston in said working chamber dividing said chamber into separate compartments, a valve casing overlying the working chamber and having passages constituting bypasses between said compartments, said casing also having in the upper portion thereof a chamber communicating with the upper part of said reservoir chamber, detachable means affording access to said casing chamber from the exterior of the housing to permit introduction of a fluid-actuating medium to the interior of the housing, and valve-controlled passages connecting the respective compartments of the working chamber with the lower part of the reservoir through which the said actuating medium may be drawn into said compartments.

10. In a hydraulic shock absorber, a housing, a partitioning element in said housing dividing the interior thereof into a working chamber and a reservoir chamber, a rotary piston operating in said working chamber and journaled in bearings in the housing and in said partitioning element, said piston having a shaft extending through the bearing in said partitioning element and through the reservoir chamber to the exterior of the casing, and a passage extending from the inner end of the bearing in said partitioning element to the reservoir chamber above the piston.

11. In a hydraulic shock absorber, the combination with a housing, of a partitioning member dividing the housing into a working chamber and a reservoir chamber, a rotary piston operative in said working chamber and having a shaft journaled in said partitioning element and projecting through the reservoir chamber to the exterior of the casing, a stuffing box in the housing through which said shaft extends, and a baffle on the shaft adjacent the end of the bearing in said partitioning member.

12. In a hydraulic shock absorber, the combination with a housing, of a partitioning member dividing the interior of the housing into a working chamber and a reservoir chamber, a rotary piston operative in the working chamber and having a shaft journaled in the partitioning member and projecting through the reservoir chamber to the exterior of the housing, a stuffing box in the housing through which said shaft extends, and a collar on the shaft adjacent the end of the bearing in said partitioning member constituting a follower for said stuffing box, and and constituting a baffle to divert oil escaping through said bearing from the working chamber.

13. A hydraulic shock absorber comprising a housing having a working chamber, a rotary piston operative in the working chamber and dividing said chamber into separate compartments, a bypass passage between said compartments operative only during a limited movement of the piston in either direction from a neutral position, and means for determining the neutral position of the piston from the exterior of the housing.

14. In a hydraulic shock absorber, the combination with a housing enclosing a working chamber, of a piston operative in said chamber and dividing the chamber into separate compartments, a valve casing in the housing overlying said working chamber, passages in said valve casing constituting bypasses between the working chamber compartments, spring-pressed check valves controlling said bypasses, and means affording access to the said valve springs from the exterior of the housing to permit replacement of said springs without disassembling the housing.

15. A hydraulic shock absorber comprising a housing, a partition member dividing the housing into working and reservoir chambers, a piston operative in the working chamber and dividing said chamber into separate compartments, a port in said partition member and communicating at one end with the reservoir chamber, groove means in the working chamber face of said partition member and communicating with said port and a thin plate abutting the working chamber face of the partition having openings placing each of said compartments in communication with said groove means.

16. A hydraulic shock absorber comprising a housing, a partition dividing the housing into storage and working chambers, a piston in the working chamber, a shaft on which the piston is mounted journaled in the housing and partition and extending therethrough to the exterior of the housing and a thin plate abutting the working chamber face of the partition having the central bore for the shaft of greater diameter than the shaft whereby to form an annular channel about the shaft and means for connecting the channel with the storage chamber.

17. A shock absorber comprising a housing including end walls, a partition intermediate the end walls dividing the housing into storage and working chambers, a shaft journaled in said partition and an end wall of the housing and a piston on the shaft within the working chamber there being an annular channel surrounding the shaft at the working chamber side of the partition and means to connect the storage chamber with said channel.

18. A hydraulic shock absorber comprising a housing, a partition dividing the housing into storage and working chambers, a rotary piston mounted in the working chamber, a shaft for the piston extending through the partition and housing to the exterior of the housing, a portion of the shaft-receiving opening at the working chamber side of the partition being of greater diameter than the shaft, and means connecting said portion of the shaft-receiving opening with the storage chamber.

19. A hydraulic shock absorber comprising a housing, a partition dividing the housing into working and reservoir chambers, a rotary piston in the working chamber, a thin plate interposed between the piston and the adjacent face of the partition, said plate having openings formed therein and combining with the partition to provide a grooved wall against which one face of the piston operates and a channel connecting the working chamber and the reservoir chamber, and a check valve permitting flow through said channel from the reservoir chamber to the working chamber.

MICHAEL FIELDMAN.